(12) United States Patent
Reuter et al.

(10) Patent No.: US 11,396,767 B2
(45) Date of Patent: Jul. 26, 2022

(54) HINGE ASSEMBLY FOR A SWITCH CABINET

(71) Applicant: RITTAL GMBH & CO. KG, Herborn (DE)

(72) Inventors: Wolfgang Reuter, Liebenscheid (DE); Timo Schindler, Gladenbach (DE)

(73) Assignee: RITTAL GMBH & CO. KG, Herborn (DE)

( * ) Notice: Subject to any disclaimer, the term of this patent is extended or adjusted under 35 U.S.C. 154(b) by 636 days.

(21) Appl. No.: 16/328,329

(22) PCT Filed: Aug. 3, 2017

(86) PCT No.: PCT/DE2017/100657
§ 371 (c)(1),
(2) Date: Feb. 26, 2019

(87) PCT Pub. No.: WO2018/050151
PCT Pub. Date: Mar. 22, 2018

(65) Prior Publication Data
US 2021/0332623 A1 Oct. 28, 2021

(30) Foreign Application Priority Data
Sep. 15, 2016 (DE) .......................... 102016117378.9

(51) Int. Cl.
*E05D 7/10* (2006.01)
*E05D 5/12* (2006.01)
(Continued)

(52) U.S. Cl.
CPC ............ *E05D 5/128* (2013.01); *E05D 5/065* (2013.01); *E05D 7/1055* (2013.01); *H02B 1/38* (2013.01); *E05Y 2900/208* (2013.01)

(58) Field of Classification Search
CPC ... E05D 2007/1027; E05D 5/128; E05D 5/16; E05D 5/065; E05D 5/10; E05D 7/1005;
(Continued)

(56) References Cited

U.S. PATENT DOCUMENTS 743,279 A * 11/1903 Haycock ................... E05D 3/02
16/265
1,341,063 A * 5/1920 McQueen ................. E05D 3/02
16/262
(Continued)

FOREIGN PATENT DOCUMENTS

AU  2004100407 A4 * 7/2004
DE       2628952 A1 * 1/1978 ............. E05D 7/105
(Continued)

OTHER PUBLICATIONS

International Search Report (in English and German) and Written Opinion (in German) issued in PCT/DE2017/100657, dated Nov. 3, 2017; ISA/EP.

*Primary Examiner* — Chuck Y Mah
(74) *Attorney, Agent, or Firm* — Harness, Dickey & Pierce, P.L.C.

(57) ABSTRACT

The invention relates to a hinge assembly for a switch cabinet, comprising a housing-side hinge half and a door-side hinge half, which are connected to one another such that they swivel in relation to one another, wherein the housing-side hinge half has a mounting flange for securing to a vertical profile of a switch cabinet housing, as well as two hinge bolts extending in a vertical direction, arranged at a distance to one another in the vertical direction and facing one another with the free ends thereof, wherein the hinge bolts are accommodated in a respective bolt seat of the housing-side hinge half, wherein the hinge bolts are accommodated in their respective bolt seat such that they cannot move at least in the vertical direction, and in that they
(Continued)

protrude from the respective bolt seat via their free ends, wherein the door-side hinge half has a bolt-receiving means with a vertical measurement that is less than or equal to the distance of the free ends of the hinge bolts.

14 Claims, 11 Drawing Sheets

(51) Int. Cl.
 *E05D 5/06* (2006.01)
 *H02B 1/38* (2006.01)
(58) Field of Classification Search
 CPC ......... E05D 7/1055; E05D 7/12; E05D 7/123; E05D 2007/126; H02B 1/38; H02B 1/44; H02B 1/46; Y10T 16/53613; Y10T 16/5361; Y10T 16/536075; Y10T 16/5478; Y10T 16/551
 See application file for complete search history.

(56) References Cited

U.S. PATENT DOCUMENTS

| | | | | |
|---|---|---|---|---|
| 2,803,850 | A * | 8/1957 | Hooper | E05D 11/06 16/341 |
| 3,375,546 | A * | 4/1968 | Peterson | E05D 7/1044 16/258 |
| 3,431,591 | A * | 3/1969 | Betso | E05D 7/105 16/265 |
| 4,424,607 | A * | 1/1984 | Langenhorst | E05D 5/10 16/38 |
| 4,584,739 | A * | 4/1986 | Konen | B62D 33/033 16/266 |
| 5,127,132 | A * | 7/1992 | Karlin | E05D 7/1044 16/261 |
| 5,355,556 | A * | 10/1994 | Lyon | E05D 7/02 16/231 |
| 5,561,886 | A * | 10/1996 | Flamme | E05D 5/065 16/260 |
| 5,940,937 | A * | 8/1999 | Churchill | H02B 1/40 16/382 |
| 6,238,027 | B1 | 5/2001 | Köhler et al. | |
| 6,283,565 | B1 | 9/2001 | Köhler et al. | |
| 9,169,679 | B2 * | 10/2015 | McAdoo | E05D 3/02 |
| 9,470,027 | B2 * | 10/2016 | Ikemoto | E05D 7/105 |
| 9,871,353 | B2 | 1/2018 | Boehme et al. | |
| 9,991,684 | B2 | 6/2018 | Brueck et al. | |
| 10,024,348 | B2 | 7/2018 | Schindler | |
| 2016/0352080 | A1 | 12/2016 | Brueck et al. | |
| 2016/0352082 | A1 | 12/2016 | Boehme et al. | |
| 2016/0352083 | A1 | 12/2016 | Brueck et al. | |
| 2016/0363150 | A1 | 12/2016 | Schindler | |
| 2017/0268269 | A1* | 9/2017 | Nicholas, III | E05D 5/12 |
| 2018/0375302 | A1 | 12/2018 | Reuter et al. | |

FOREIGN PATENT DOCUMENTS

| | | |
|---|---|---|
| DE | 9207804 U1 | 9/1992 |
| DE | 29720515 U1 | 1/1998 |
| DE | 19817245 A1 | 10/1999 |
| DE | 19723555 C2 | 3/2002 |
| DE | 102014101404 A1 | 8/2015 |
| WO | WO-2013110292 A1 | 8/2013 |

* cited by examiner

HINGE ASSEMBLY FOR A SWITCH CABINET

CROSS-REFERENCE TO RELATED APPLICATIONS

This application is a 371 U.S. National Stage of International Application No. PCT/DE2017/100657, filed on Aug. 3, 2017, which claims priority to German Application No. 10 2016 117 378.9, filed on Sep. 15, 2016. The entire disclosures of the above applications are incorporated herein by reference.

BACKGROUND

This section provides background information related to the present disclosure which is not necessarily prior art.

Technical Field

The invention relates to a hinge assembly for a switch cabinet comprising a housing-side hinge half and a door-side hinge half which are connected to one another so that they swivel in relation to one another. The housing-side hinge half has a mounting flange for securing to a vertical profile of a switch cabinet housing as well as two hinge bolts extending in a vertical direction, arranged at a distance to one another in the vertical direction and facing one another with their free ends. The hinge bolts are accommodated in a respective bolt seat of the housing-side hinge half. Such a hinge assembly is known from DE 197 23 555 C2. Similar hinge assemblies are also described in DE 297 20 515 U1, DE 198 17 245 A1, and WO 2013/110292 A1.

Discussion

The known hinge arrangements have the disadvantage that they are relatively time consuming to install. If the door-side hinge half is for example, preinstalled on a switch cabinet-side door element and the housing-side hinge half on the vertical profile of a switch cabinet housing corpus, the two hinge halves must, for the door installation, be brought together at the housing so that the two bolts of the housing-side hinge half are aligned with a bolt-receiving means of the door-side hinge half. If this was successful, the described pre-alignment of the door and the housing must be maintained, and the hinge bolts of the housing-side hinge half driven into the bolt-receiving means of the door-side hinge half to fix the hinge halves to each other. To avoid damage to the hinge assembly when the hinge bolts are driven in due to a malalignment of the door element and the switch cabinet corpus, often a second person is necessary to drive in the hinge bolts, especially for inexperienced users.

SUMMARY

This section provides a general summary of the disclosure, and is not a comprehensive disclosure of its full scope or all of its features.

It is therefore an aspect of the invention to further develop a hinge assembly for a switch cabinet of the type described above that makes it possible to join the two hinge halves in an as uncomplicated manner as possible.

It is therefore provided that the hinge bolts are accommodated in their respective bolt seats so that they cannot move at least in the vertical direction and that they protrude from the respective bolt seat via their free ends, whereby the door-side hinge half has a bolt-receiving means with a vertical measurement that is less than or equal to the distance of the free ends of the hinge bolts. The hinge assembly therefore makes it possible for the door-side hinge half to be joined with the housing-side hinge half in one simple mounting step. It is no longer necessary to drive the hinge bolts into the bolt-receiving means of the door-side hinge half after the housing-side and the door-side hinge halves have been aligned. Depending on whether the housing-side hinge half is secured to the switch cabinet housing at a left-hand stop or a right-hand stop, the door-side hinge half may be mounted to the hinge bolt that is below it and whose free ends point upward.

The housing-side hinge half may be arranged symmetrically to a plane that is perpendicular to the vertical direction and therefore also vertical to a hinge axis of the hinge assembly so that the door-side hinge half can be mounted either at the left-hand stop of a door element or the right-hand stop of a door element on a left-sided or right-sided vertical profile of a switch cabinet housing.

The housing-side hinge half may engage at a first of a left-hand stop and right-hand stop by means of a first of its two hinge bolts with the door-side hinge half, in particular with its bolt-receiving means, whereby the housing-side bolt half engages at the second of a left-hand stop and right-hand stop by means of the second of its two hinge bolts with the door-side hinge half, in particular its bolt-receiving means.

The housing-side hinge half may have at least one groove at its inner side that faces the door-side hinge half, into which a protrusion at the outer circumference of the door-side hinge half engages in a form-fitting manner in the open position of the door-side hinge half and fixes the door-side hinge half in the vertical direction and therefore in the axial direction of the hinge bolts. The protrusion and the at least one groove may be arranged to one another so that they engage in a form-fitting manner from a particular opening angle on and therefore fix the door-side hinge half to the housing-side hinge half. It may be provided, for example, that the door-side hinge half can be lifted out of the housing-side hinge half only in a partially opened state. The protrusion may have a spherical surface at its outer circumference facing at least one groove, which lies against a complementary bottom area of the groove in a form-fitting manner. The length of the protrusion along the spherical outer surface may be configured to be accommodated in the groove in an at least partially form-fitting manner by means of a certain opening angle range so as to fix the door-side hinge accordingly by means of the angle range in the vertical direction, so that it is impossible to lift the door-side hinge half out of the housing-side hinge half.

The housing-side hinge half may comprise at least a first and a second groove at its inner side facing the door-side hinge half, whereby at a first of the left-hand stop and right-hand stop the protrusion engages with the first groove in a form-fitting manner and whereby at the second of the left-hand stop and right-hand stop the protrusion engages with the second groove in a form-fitting manner.

The bolt seats of the housing-side hinge half and the respective hinge bolt may be formed as one piece. To this purpose, the housing-side hinge half may be formed for example as an injection-molded piece.

The housing-side hinge half may, however, be formed as a shaped sheet metal part as well. This has the advantage over an injection-molded part that it can be produced in a cost-effective manner. The bolt seats of the housing-side hinge half may, for example, have an annular sheet metal wall or be formed as such, into which one of the hinge bolts each is inserted by means of a plug section, whereby the sheet metal wall is firmly connected, in particular pressed into, welded to, or adhered to the plug section.

The plug section of the hinge bolt may transition to the free end of the hinge bolt by means of a flange at the outer circumference of the hinge bolt, whereby the flange has a contact surface at its side facing the bolt seat by means of which the hinge bolt rests on a front side of the bolt seat in a form-fitting manner, and whereby the flange has a sliding bearing surface at its side facing away from the bolt seat, by means of which the housing-side hinge half is movably positioned on a front surface of the bolt-receiving means of the door-side hinge half.

The sliding bearing surface may be roughened or ribbed so that a potential equalization is achieved between the hinge halves on the door-side hinge half placed on the sliding bearing surface. The door-side hinge half and therefore also its front side facing the sliding bearing surface may be varnished on the production side so that the layer of varnish is broken when a door to which the door-side hinge half is connected is swiveled.

The bolt seats of the housing-side hinge half may be molded over the side of the mounting flange, whereby, at half the distance between the two free ends of the hinge bolts facing each other, an arresting hook starting from the side in the direction of the hinge bolts and perpendicular to the axial direction of the hinge bolts protrudes comprising a stop for the door-side hinge half on the sides facing one of the hinge bolts.

The bolt-receiving means of the door-side hinge half may, at its outer circumference, comprise a nonrounded geometry with a protruding lip, whereby in the open position of the door-side hinge half, the protruding lip, and the arresting hook overlap so that, depending on the side of the stop of the door-side hinge half, one of the stops and the protruding lip face each other. The door-side hinge half may be a formed strip of metal on which the protruding lip is arranged on a transition between an attachment side for the installation of the door-side hinge half on a door element and the bolt-receiving means. The protruding lip and the attachment side may finally be joined with each other by means of a notched section of the strip of metal.

To prevent the door-side hinge half from being accidentally lifted out of the housing-side hinge half, an anti-lift device may be provided which sits on the door-side hinge half by means of an upper front surface of the door-side hinge half and protrudes into the bolt-receiving means and into which the upper of the two hinge bolts protrudes in the vertical direction as well.

In addition, the anti-lift device may comprise a cylinder body with an upper and a lower end, whereby the upper end comprises a plug receptacle with an insertion head at the inner circumference and the lower end a projecting peg with a lower insertion head at the outer circumference.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are explained below with the help of the figures.

DETAILED DESCRIPTION

Example embodiments will now be described more fully with reference to the accompanying drawings.

Figure 1:
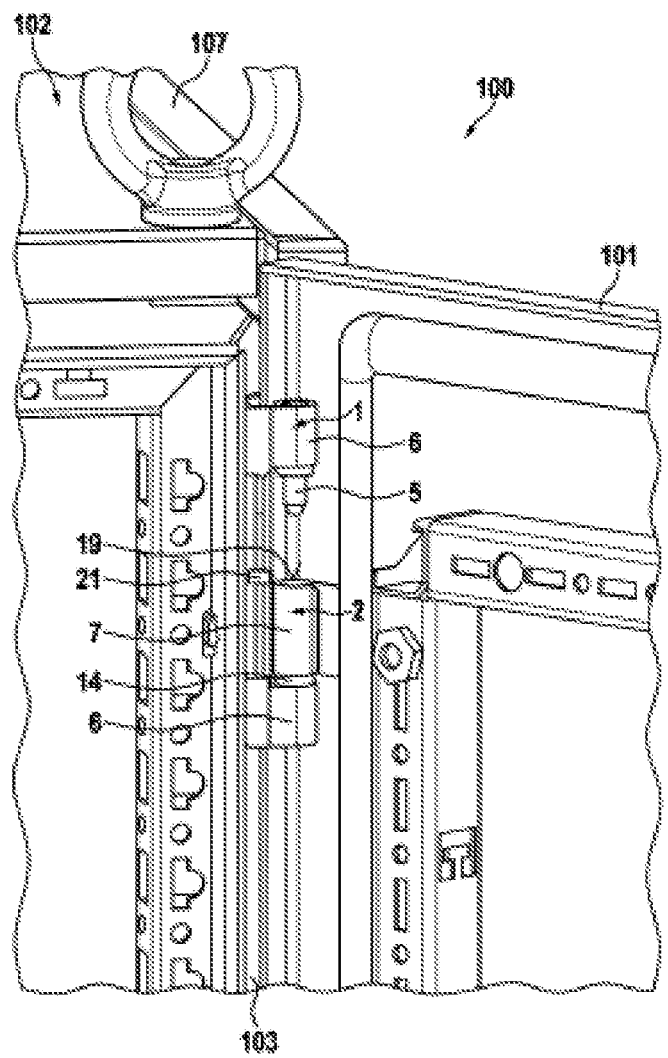
FIG. 1 shows a detailed view of the switch cabinet using a hinge assembly according to one embodiment.

FIG. 1 shows a detailed view of a switch cabinet 100 on the housing 102 of a door element 101 which can be swiveled in the right-hand stop that is mounted by means of the hinge assembly. For better illustration purposes, only the top hinge assembly is shown. An identical hinge assembly is arranged further down in the vertical direction of the switch cabinet 100 to provide another point of attachment and rotation for the swiveling of the door element 101 relative to the housing 102.

As shown, the hinge assembly according to the invention is formed in the manner of a mounted hinge. The housing-side hinge half 1 is fixed to a vertical profile 103 of the frame of the switch cabinet housing 102. The vertical profile may have a geometry, for example, as it is known from DE 10 2014 101 404 A1.

The assembly according to FIG. 1 shows as well that the hinge 1,2 due to its configuration is symmetrical to the horizontal plane and can be used either for the left-hand stop or for the right-hand stop, whereby in the case that the housing-side hinge half 1 shown in FIG. 1 is used for the left-hand stop, the door-side hinge half 2 then interacts with the upper hinge bolt 5 shown in the illustration; i.e., the door-side hinge half 2 is thus hooked into hinge bolt 5 which, in the application variation according to FIG. 1, has no function. It can be seen as well that the housing-side hinge half 1 has an arresting hook 21, which arrests the door-side hinge half 2 on the respective bolt seat 6 or the corresponding hinge bolt 5, depending on whether the hinge assembly is used for the left-hand stop or the right-hand stop. The arresting hook 21 and the door-side hinge half 2 may be aligned in such a way that the door-side hinge half 2 or the door element 101, on which the door-side half 2 is secured, can only be lifted out of the housing-side hinge half at a certain angle of the door-side hinge half 2 in relation to the housing-side hinge half 1.

Figure 2:
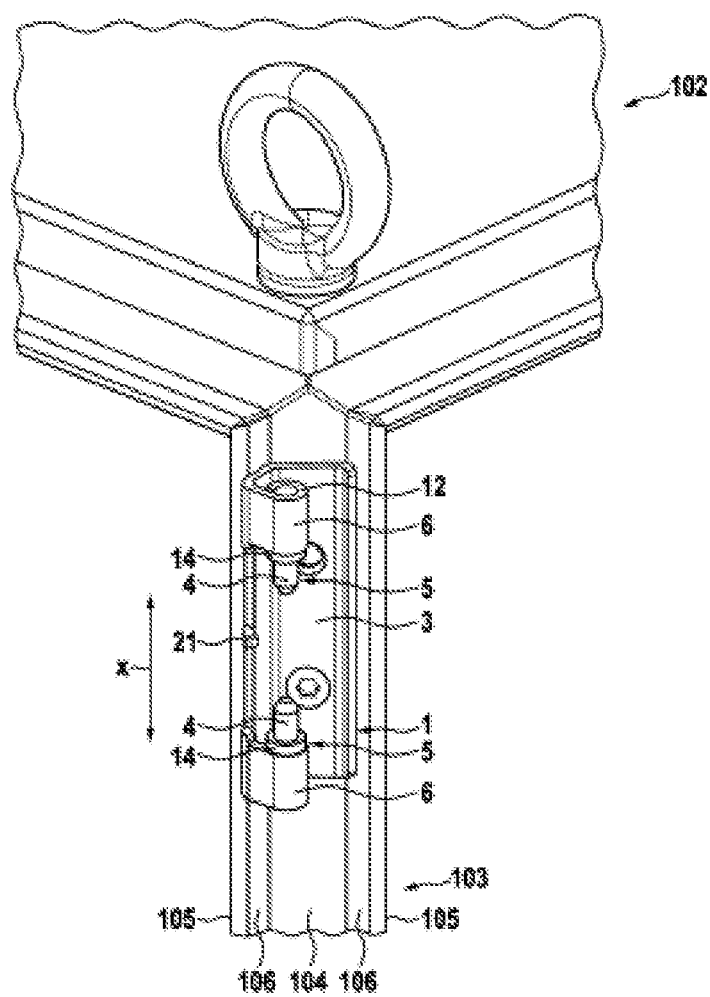
FIG. 2 shows the switch cabinet according to FIG. 1 with removed door element and side part.

In addition to FIG. 1, FIG. 2 shows that the housing-side hinge half 1 has a mounting flange 3 to which a receiving contour of the vertical profile 103 of the frame of the switch cabinet housing 102 is adapted. The vertical profile may, for example, have an undercut contour in which the mounting flange is received in a form-fitting manner and is fixed by means of a bolt connection. The vertical profile of a first and a second sealing ridge 106 with end-sided sealing edges 105 which are oriented perpendicular to each other and thus provide sealing edges on two perpendicular sides of the switch cabinet housing. The sealing ridges 106 may be joined together by a connection section 104, whereby the assembly of sealing ridges 106 and the connection section 104 specifically forms the receiving means for the form-fitting position of the mounting flange 3.

FIG. 2 also shows already that the housing-side hinge half 1 can be formed as a simple sheet metal part, whereby the bolt seats 6 for the hinge bolts 5 are an annularly formed metal wall which receives the respective bolts 5 for example in the force fit.

All embodiments of the invention have in common that the hinge bolts 5 are immovably arranged to each other at least in the axial direction, thereby clearly differentiating the hinge assembly according to the invention from the hinge assemblies known from prior art. To this purpose, the free ends 4 of the hinge bolts 5 have a distance from each other that is greater than a vertical measurement of the bolt-receiving means 7 of the door-side hinge half 2. In the embodiment according to FIGS. 1 and 2, the bolt-receiving means 7 have a measurement in the axial direction that is smaller than or equal to the distance between the respective flange 14 of the bolts 5 and a corresponding stop of the arresting hook 21.

Figure 3:
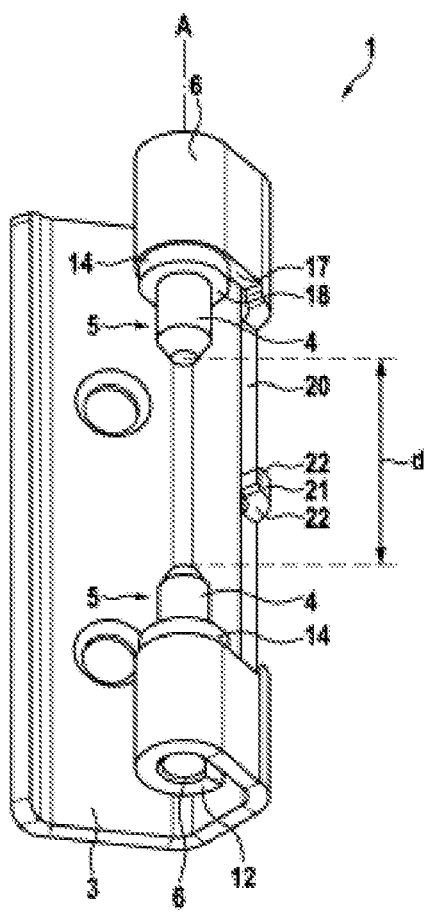
FIG. 3 shows an embodiment of a housing-side hinge half of a hinge assembly.
Figure 4:
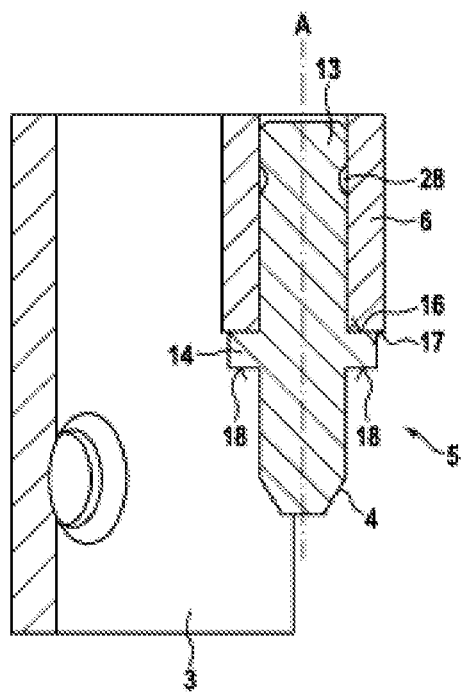
FIG. 4 shows a hinge bolt with a plug section in a bolt seat of a housing-side hinge half.

As can be seen when viewed together with FIGS. 3 and 4, the hinge bolt 5 with its plug section 13 is accommodated in the bolt seat 6 of the housing-side hinge half 1 in a form- and force-fitting manner. To create a crimped connection, the plug section has at its outer circumference a surrounding groove 28 with which the bolt seat 6 can be pressed together with the plug section 13. The distance d between the free ends 4 of the hinge bolts 5 over which the hinge bolts 5 protrude from the respective bolt seat 6 is specifically chosen so that it is smaller than or equal to the measurement of the door-side hinge half 2 in the axial direction A drawn in (refer to FIG. 2), so that for the mounting of the door-side hinge half 2 into the housing-side hinge half 1, the bolt-receiving means 7 can be aligned with the lower hinge bolts 5 in the vertical direction, and so that the door-side hinge half 2 can be hung on the free end 4 of the hinge bolt 5 by means of its bolt-receiving means 7.

The arresting hook 21 extends from a side 20 of the mounting flange 3 in the direction of the hinge axis A drawn in FIG. 3, whereby it has one stop 22 each on the sides that face each other in the vertical direction, by means of which the door-side hinge half 2 is blocked or released, depending on its opening angle. The hinge bolts 5 furthermore have a surrounding flange 14 with two surfaces that face each other in the vertical direction x. With a first of the surfaces, the bolt 5 rests on a front side 17 of the respective bolt seat 6. The respectively opposing surface that faces away from the bolt seat 6 forms a sliding bearing surface on which the bolt-receiving means 7 of the door-side hinge half 2 is movably positioned, when the door-side hinge half 2 is movably positioned above the one or the other hinge bolt 5, depending on whether a right-hand stop or a left-hand stop is present. It can be seen once again that the bolt seat 6 is formed as a metal wall 12 which extends from the side 20 of the mounting flange 3 and is formed at its end as an annular metal wall 12 which forms the bolt seat 6.

Figure 5:
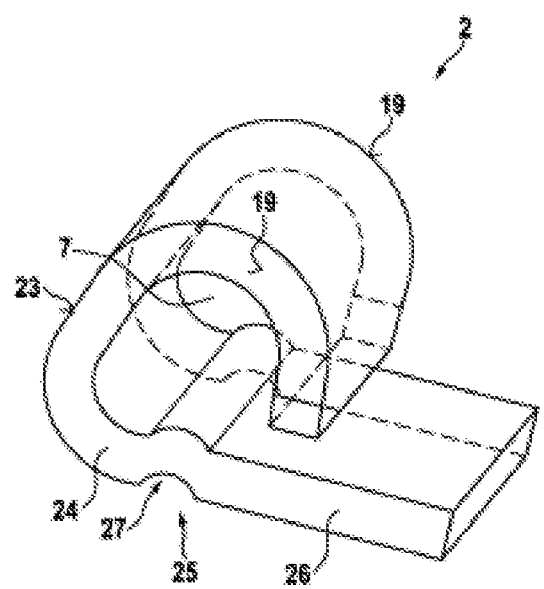
FIG. 5 shows an embodiment of a door-side hinge half.

FIG. 5 shows an exemplary embodiment of a door-side hinge half 2 which can be used in connection with a housing-side hinge half as shown in the previous figures. It can be seen once again that the door-side hinge half 2 can, just as in the embodiment shown in the previous figure, be formed as a simple and therefore cost-effective shaped sheet metal part. It is, in particular, possible to form the door-side hinge half from a metal strip with a few forming processing steps. No further processing steps such as tensioning processing steps are required.

The door-side hinge half 2 primarily consists of an attachment side 26 which transitions into the bolt-receiving means 7 through a transition 25 comprising a notched section 27. The notched section 27 has a groove or notch at the outer circumference 23 of the door-side hinge half 2 which extends perpendicular to the longitudinal direction of the metal strip of the door-side hinge half 2 or, respectively, parallel to the hinge axis of the bolt-receiving means 7. Adjoining to the notched section 27, the door-side hinge half 2 has a protruding lip 24 so that the bolt-receiving means 7 has a nonrounded geometry and, in particular of the protruding lip 24, is expanded radially to the hinge axis. Together with FIGS. 1 and 4, it can be seen that, depending on the opening angle of the door element 101 (refer to FIG. 1), the door-side hinge half 2 overlaps with the arresting hook 21 by means of its protruding lip 24 so that the door element 101 cannot be lifted out of the housing-side hinge half 1. Only when the door element 101 has a certain opening angle where specifically the protruding lip, seen from the vertical direction, no longer overlaps with the arresting hook can the door element 101 be lifted from the housing-side hinge half 1.

The door-side hinge half 2 is formed as a fully symmetrical component as well, whereby the opposing front sides 19 movably rest, depending on the side where the stop is, on the sliding bearing surface 18 of the flange 14 of the, in the vertical direction, lower hinge bolt 5.

Figure 6:
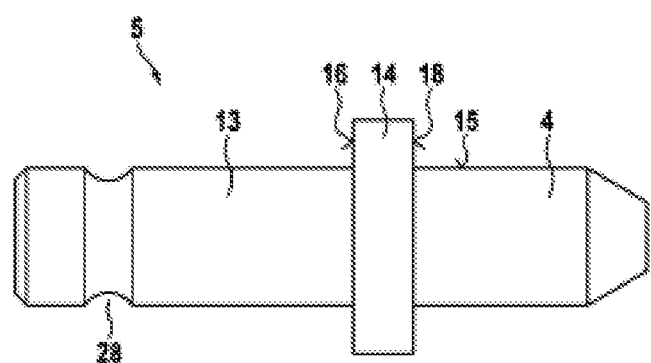
FIG. 6 shows a cross-sectional view of a hinge bolt according to one embodiment.

A cross-sectional view for a hinge bolt is shown in FIG. 6. The hinge bolt 5 primarily consists of a plug section 13 which transitions to the free end 4 by means of a surrounding flange 14. The tip of the free end 4 has the shape of a cone to facilitate the threading of the bolt 5 into the bolt-receiving means 7 of the door-side hinge half 2. The plug section 13 has a surrounding groove 28 with which the hinge bolt 5 can be prepressed into the bolt seat 6 of the housing-side hinge half 1. The flange 14 is formed as a surrounding annular flange with two surfaces 16, 18 that extend vertically to the longitudinal axis of the bolt 5, whereby the surface 18 facing the free end 4 forms a sliding bearing surface on which a door-side hinge half 2 is movably placed on its front side 19 and whereby the contact surface 16 facing the plug section 13 is a bearing surface that forms a stop with which the hinge bolt 5 comes to a stop at a front side 17 of the bolt seat 6 to precisely adjust the hinge bolt 5 exactly opposite the bolt seat 6 and therefore the vertical distance between the two hinge bolts 5 of the housing-side hinge half 1.

Figure 7:
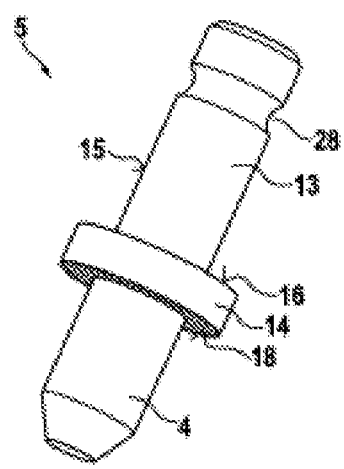
FIG. 7 shows a perspective view of a hinge bolt according to FIG. 6.

FIG. 7 shows the hinge bolt 5 according to FIG. 6 in a perspective view. The sliding bearing surface 18 is roughened or ribbed so that when the door-side hinge half is placed on the sliding bearing surface 18, a potential equalization is created between the hinge halves. The door-side hinge half, which may be premounted on a switch cabinet, and therefore also its front surface 19 facing the sliding bearing surface 18 (see FIG. 55) may be dip-coated on its production side together with the door so that as a door to which the door-side hinge half is mounted is swiveled, the coat of varnish is broken.

Figure 8:
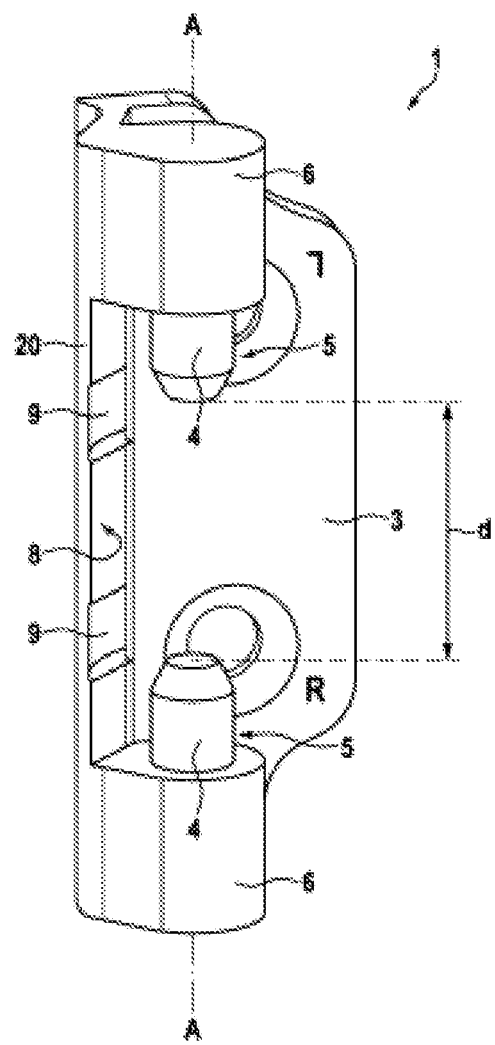
FIG. 8 shows a perspective view of another embodiment of a housing-side hinge half.
Figure 9:
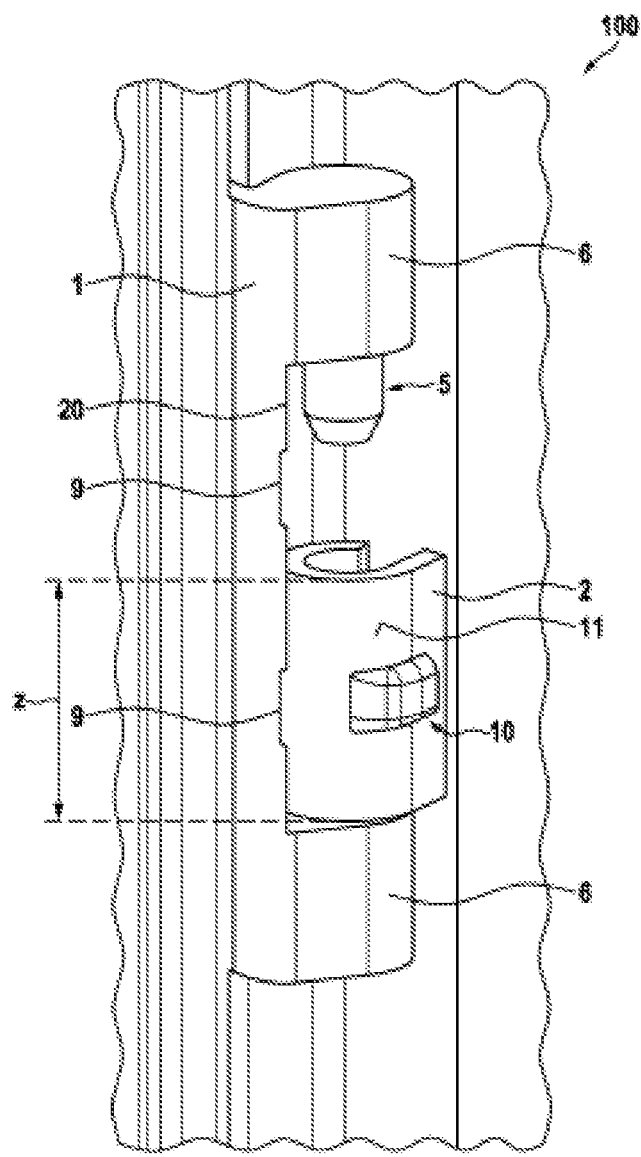
FIG. 9 shows a switch cabinet assembly that uses the housing-side hinge half according to FIG. 8.

FIGS. 8 and 9 describe another embodiment of a hinge assembly which substantially differs from the embodiments described above in two aspects. Even if the different aspects in the embodiment described below are combined according FIGS. 8 and 9, a person skilled in the art will notice that these may be applied individually as well, for example in modification of the previously described embodiments.

A first aspect relates to the circumstance that the first and the second hinge half 1, 2 are formed as molded pieces and therefore not as formed metal pieces. Accordingly, the hinge bolts 5 and the bolt seat 6 are formed as one part. Another aspect relates to the arresting of the door-side hinge half 2 which depends on the opening angle in relation to the housing-side hinge half 1. To this purpose, the embodiment shown in FIGS. 8 and 9 provides that the mounting flange 3 is molded on its longitudinal edge 20 by means of which the bolt seats 6 are molded to the mounting flange 3, comprises at least one groove 9 in which a protrusion 10 at the outer circumference of the door-side hinge half 2 engages in a form-fitting manner, so thereby fix or release the door-side hinge half 2 in relation to the housing-side hinge half 1. It can be seen that the mounting flange 3 has two grooves 9, whereby a first groove 9 is assigned to the upper hinge bolt 5 in the illustration shown in FIG. 8 and whereby a second groove 9 is assigned to the lower hinge bolt 5 in the illustration shown in FIG. 8. When looking at FIGS. 8 and 9 together, it becomes clear that, depending on whether the hinge assembly is arranged for the left-hand stop or the right-hand stop on a vertical profile of a hinge cabinet, the protrusion 10 can engage with the upper or lower groove 9 in the illustration shown in FIG. 8 depending on the opening angle. The grooves 9 are open toward the edge side 20 of the mounting flange 3 to allow the protrusion 10 to slide in a nonresistant manner when the door-side hinge half 2 is swiveled. It makes sense that the angle range in which a lifting of the door-side hinge half 2 out of the housing-side hinge half 1 is to be blocked can be adjusted specifically across the length of the protrusion 10 along the outer circumference 11 of the door-side hinge half 2.

Figure 10:
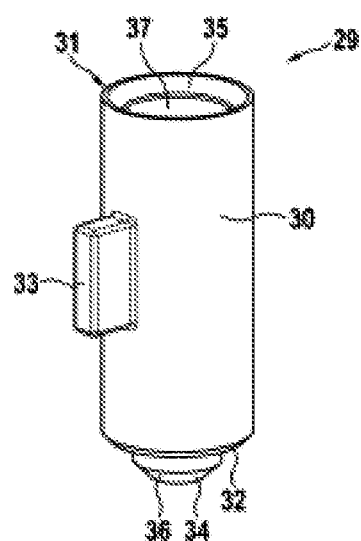
FIG. 10 shows an anti-lift device according to one embodiment of the invention.
Figure 11:
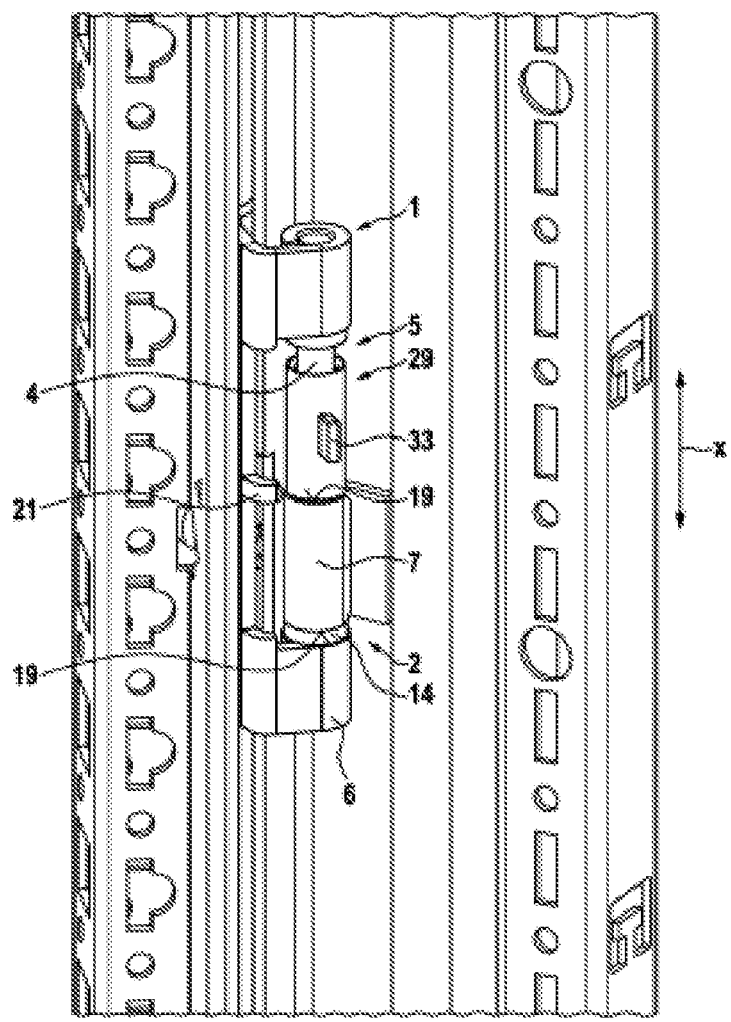
FIG. 11 shows an exemplary installation situation of the anti-lift device according to FIG. 10.

To avoid the door-side hinge half from being accidentally lifted out of the housing-side hinge half, an anti-lift device 29 according to FIG. 10 may be provided which, as shown in FIG. 11, is placed on an upper front surface 19 of the door-side hinge half 2 into the door-side hinge half 2 on the one hand and protrudes into the bolt-receiving means 7 and also, on the other hand, protrudes into the upper of the two hinge bolts 5 in the vertical direction x. The anti-lift device 29 has a cylinder body 30 with an upper and a lower end 31, 32, whereby the upper end 31 has a plug receptacle 37 with an insertion head 35 at the inner circumference and the lower end 32 a projecting peg 34 with a lower insertion head 36 at the outer circumference. A grip part 33 at the outer circumference of the cylinder body 30 makes the anti-lift device 29 easier to handle.

The features of the invention disclosed in the description above, in the drawings, as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A hinge assembly for a switch cabinet comprising:
a housing side hinge half and a door-side hinge half which are connected to one another so that they swivel in relation to one another,
whereby the housing-side hinge half has a mounting flange for securing to a vertical profile of a switch cabinet housing as well as two hinge bolts extending in the vertical direction, arranged at a distance to one another in the vertical direction with distal ends of each one of the two hinge bolts facing each other,
wherein the hinge bolts are accommodated in a respective bolt seat of the housing-side hinge half and protrude from the respective bolt seat via their distal ends, characterized in that the hinge bolts are accommodated in their respective bolt seat at a distance from each other so that they cannot move at least in the vertical direction,
wherein the door-side hinge half has a bolt-receiver with a vertical measurement that is less than or equal to the distance between the distal ends of the hinge bolts.

2. The hinge assembly according to claim 1, in which the housing-side hinge half is symmetrical to a plane that runs perpendicular to the vertical direction and therefore also perpendicular to a hinge axis of the hinge assembly, so that the door-side hinge half can be mounted on a left-sided or right-sided vertical profile of a switch cabinet housing.

3. The hinge assembly according to claim 2, wherein the housing-side hinge half has a first stop and a second stop, the first stop capable of being engaged when one of the hinge bolts is engaged by the bolt-receiver, with the second stop capable of being engaged when the other hinge bolt is engaged by the bolt-receiver.

4. The hinge assembly according to claim 1, wherein the housing-side hinge half has at least one groove at its inner side that faces the door-side hinge half, into which a protrusion at the outer circumference of the door-side hinge half engages in a form-fitting manner in the open position of the door-side hinge half and fixes the door-side hinge half in the vertical direction and therefore in the axial direction of the hinge bolts.

5. The hinge assembly according to claim 4, wherein the housing-side hinge half includes a second groove at its inner side facing the door-side hinge half, whereby the protrusion engages with the first groove or the second groove in a form-fitting manner.

6. The hinge assembly according to claim 1, wherein the bolt seats of the housing-side hinge half and the respective hinge bolt are formed as one piece.

7. The hinge assembly according to claim 1, wherein the bolt seats of the housing-side hinge half has an annular sheet metal wall into which one of the hinge bolts is inserted by means of a plug section, whereby the sheet metal wall is firmly connected, to the plug section.

8. The hinge assembly according to claim 7, wherein the plug section of the hinge bolt is configured to transition to the distal end of the hinge bolt by means of a flange at the outer circumference of the hinge bolt, whereby the flange has a contact surface at its side facing the bolt seat by means of which the hinge bolt rests on a front side of the bolt seat in a form-fitting manner, and whereby the flange has a sliding bearing surface at its side facing away from the bolt seat, by means of which the housing-side hinge half is movably positioned on a front surface of the bolt receiver of the door-side hinge half.

9. The hinge assembly according to claim 1, whereby the bolt seats of the housing-side hinge half are molded over an edge side of the mounting flange to the mounting flange, whereby, at half the distance between the two distal ends of the hinge bolts facing each other, an arresting hook starting from the edge side in the direction of the hinge bolts and perpendicular to the axial direction of the hinge bolts protrudes, and whereby the arresting hook comprises at its opposing sides facing one of the hinge bolts a stop for the door-side hinge half.

10. The hinge assembly according to claim 9, wherein the bolt-receiver of the door-side hinge half has a nonrounded geometry with a protruding lip, whereby in the open position of the door-side hinge half, the protruding lip, and the arresting hook overlap so that the door element cannot be lifted until the door element has been opened to a position where the protruding lip no longer overlaps the arresting hook.

11. The hinge assembly according to claim 10, wherein the door-side hinge half is formed strip of metal on which the protruding lip is arranged on a transition between an attachment side for the installation of the door-side hinge half on a door element and the bolt-receiver.

12. The hinge assembly according to claim 11, wherein the protruding lip and the attachment side are joined with each other by means of a notched section of the strip of metal.

13. The hinge assembly according to claim 1, which furthermore comprises an anti-lift device, which sits on the door-side hinge half by means of an upper front surface of the door-side hinge half and protrudes into the bolt-receiver and into which the upper of the two hinge bolts protrudes in the vertical direction as well.

14. The hinge assembly according to claim 13, whereby the anti-lift device comprises a cylinder body with an upper and a lower end, whereby the upper end comprises a plug receptacle with an insertion head at the inner circumference and the lower end a projecting peg with a lower insertion head at the outer circumference.

* * * * *